(12) United States Patent
Mori

(10) Patent No.: US 6,458,274 B1
(45) Date of Patent: Oct. 1, 2002

(54) DEVICE FOR TREATING A FLUID WITH ULTRA-HIGH MAGNETIC FORCE

(75) Inventor: Yoshiharu Mori, Tokyo (JP)

(73) Assignee: Morioki Sangyo Company Limited, Tokyo (JP)

( * ) Notice: Subject to any disclaimer, the term of this patent is extended or adjusted under 35 U.S.C. 154(b) by 0 days.

(21) Appl. No.: 09/386,838

(22) Filed: Aug. 31, 1999

(30) Foreign Application Priority Data

Jun. 7, 1999 (JP) ............................................ 11-158973

(51) Int. Cl.⁷ ........................ B01D 27/08; B01D 36/02; B01D 36/04; B01D 35/06
(52) U.S. Cl. ...................... 210/222; 210/223; 210/695; 210/299; 210/307
(58) Field of Search ................................ 210/222–223, 210/695, 252–256, 299, 320, 300, 307

(56) References Cited

U.S. PATENT DOCUMENTS

| | | | | |
|---|---|---|---|---|
| 2,468,864 | A | * 5/1949 | Campbell | |
| 4,001,118 | A | * 1/1977 | Enzmann | 210/187 |
| 4,147,629 | A | * 4/1979 | Geurtsen | 210/104 |
| 4,333,835 | A | * 6/1982 | Lynch | 210/305 |
| 4,351,733 | A | * 9/1982 | Salzer et al. | 210/738 |
| 5,593,737 | A | 1/1997 | Meinzer et al. | |
| 5,689,798 | A | 11/1997 | Oeste | |
| 5,874,701 | A | 2/1999 | Watanabe et al. | |
| 5,928,524 | A | * 7/1999 | Casola | 210/802 |

FOREIGN PATENT DOCUMENTS

| | | |
|---|---|---|
| JP | 06-190023 | 12/1994 |
| JP | 7-809 | 1/1995 |
| JP | 7-96173 | 4/1995 |
| JP | 7-106352 | 11/1995 |
| JP | 9-71418 | 3/1997 |
| JP | 9-262481 | 10/1997 |
| JP | 10-53437 | 2/1998 |

* cited by examiner

Primary Examiner—Matthew O. Savage
Assistant Examiner—Marianne Ocampo
(74) Attorney, Agent, or Firm—Staas & Halsey LLP

(57) ABSTRACT

A device for treating fluid with ultra-high magnetic force including the casing of the device as subdivided with partition panels into Nos. 1, 2, 3 chambers, and a separation chamber, as well as fluid passages. Both a louver and a plurality of latticed bodies providing magnetic fields are juxtaposed into the No. 1 and 3 chambers, respectively, to magnetically treat the fluid. The No. 2 chamber is provided to free the floc from the fluid, and a separation chamber is provided to precipitate the floc and discharge it outside. Slats of the louver are designed to taper off downstream. The louver and latticed bodies are removable from either the No. 1 or No. 3 chambers, respectively, and one side of the casing is detachable from the body of the casing. Permanent magnets are secured to each of the outer surfaces of both sides of the casing, providing magnetic fields through the Nos. 1, 3 chambers and a separation chamber. A plurality of injection pipes are perforated, respectively, such that they communicate with the Nos. 1, 2, 3 chambers and the separation chamber. The area of each square constituting a latticed body is enlarged or reduced according to fluid conditions. Either a screw or axial fan is fitted between a louver and the latticed body adjacent to it such that a large volume of fluid may be treated.

8 Claims, 5 Drawing Sheets

DEVICE FOR TREATING A FLUID WITH ULTRA-HIGH MAGNETIC FORCE

BACKGROUND OF THE INVENTION

1. Field of the Invention

The invention relates to an improved device for magnetically treating a fluid that may, according to fluid features, treat the fluid reasonably with a plurality of magnetic fields such that the floc and precipitate can effectively be removed from the fluid and discharged outside of said device.

2. Prior Art

Heretofore, a device has been disclosed comprising permanent magnets being. positioned outside of the device and generating magnetic force into a treatment chamber, while magnetically treating a fluid flowing between a plurality of intermediary units of magnetic material positioned parallel to each other inside the treatment chamber. (JP 7-106352). Said intermediary units of magnetic material being cylindrically shaped are juxtaposed in an equal distance inside a treatment chamber and secured thereto at its ceiling and floor made of non-magnetic material.

The prior art comprising magnets positioned outside the device has, as such, an advantage that can prevent magnetized particulates floating in a fluid from adhering to said magnets.

Generally, the closer a plurality of intermediary units of magnetic material are positioned each other, the higher magnetic fields are provided therebetween. Each intermediary unit of magnetic material has been made replaceable such that the device may efficiently be used that much longer.

Further, with improvement in the configuration of an intermediary unit of magnetic material, the prior art as cited above has been able to prevent the fluid flow speed from slowing down due to interference by the intermediary unit of magnetic material, thus enhancing activation of a fluid with magnetic fields.

The device for magnetically treating a fluid as disclosed by the prior art has deposited therein the intermediary unit of magnetic material which must be disengaged from said device whenever necessary to remove, the floc or sludge adhering thereto. Or else, a strainer has been provided such that said floc or sludge may be discharged outside therefrom.

Generally, in the prior art relative to a device for magnetically treating a fluid, the efficiency of magnetic treatment is maintained by removing from the fluid the magnetized floc or sludge adhering to such intermediary units of magnetic material as deposited inside the device.

In this case, an emphasis has been placed merely on the principal concept of an invention that the fluid flow speed should be increased, and a stronger magnetic field produced within the device. For such purposes, the prior art has heretofore provided a novel structure of a device designed to improve a fixing method, a configuration, and quality of an intermediary unit of magnetic material deposited inside the device, such that according to fluid conditions, the effect of removing the magnetized floc could be enhanced, and the replacement of parts of the device facilitated.

As indicated above, the invention disclosed by the prior art has been focused on how to narrow each distance between the cylindrically shaped intermediary units of magnetic material positioned parallel each other such that stronger magnetic fields can be gained. However, with configurations and structures of said magnetic material units designed to narrow said distance, the fluid flow speed likely slows down, affected by interference occurring in a fluid flowing therebetween. Hence, it has a disadvantage that the efficiency of magnetic treatment, enhanced by strengthening magnetic fields is cancelled out by a setback due to a decrease in the fluid flow volume.

Further, any attempt to improve the effect of magnetic fluid treatment by narrowing the distance between the cylindrically-shaped magnetic material units inside the device for the purpose of strengthening magnetic fields may only contribute to increasing both design and material costs. Also, it is an economic disadvantage incurring additional costs that an intermediary unit of magnetic material is replaced each time it is applied for different uses. That is to say, the prior art cited here has neither endorsed economical worthiness, nor has sufficiently given a solution to how to innovate uneconomical, inefficient structure of the device. It may be hardly possible to prevent impurities and scale etc. in a running or cyclical fluid from adhering to such intermediary units of magnetic material as juxtaposed each other in the device.

Besides, referring to JP 06-190023, an invention has been disclosed that a strong magnetic material unit made of either meshed or needle-shaped wires is disposed in a fluid passage of a device. Since the magnetic material unit remains fixed to the device, it is required to replace the whole device rather than said magnetic material unit whenever necessary to clean the unit, and remove the floc etc. therefrom, thereby enhancing the effect of magnetic treatment of a fluid.

SUMMARY OF THE INVENTION

The device of the invention comprises,

1. No. 1 chamber wherein a louver and a plurality of latticed bodies of pure iron bars are deposited such that a fluid can effectively be treated with magnetic fields provided by magnet units being detachable from the device,
2. No. 2 chambers wherein the fluid running slowly is treated magnetically with filtrate and flocculant affecting freeing, purifying and disinfecting of the floc and sludge,
3. A separation chamber wherein the floc and sludge thus freed are effectively discharged outside through a drain, and
4. No. 3 chamber of an identical structure with No. 1 chamber wherein the fluid goes through a repeated process of magnetic treatment freeing residual impurities therefrom and is discharged from the device.

Further, the device of the invention comprises one side of the casing being detachable from the casing such that said louver and latticed bodies can be removed therefrom whenever necessary to clean or replace them. And further the device of the invention comprises either a screw or an axial fan being deposited between a louver and the latticed body adjacent thereto such that a large volume of a fluid can be magnetically treated.

Accordingly, an object of the invention is to provide an improved device magnetically treating a fluid with a variety of permanent magnets constituting magnet units generating magnet forces from 500 to over 10,000 gausses. In this manner the device efficiently removes the floc including noxious scale and slime, as well as particulates floating in air from a variety of fluids such as air, running water, industrial water, river, sea water and petroleum.

Another object of the invention is to offer a comparatively compact system with extremely high performance.

And another object of the invention is to provide such intermediary units of magnetic material consisting of a louver and a plurality of latticed bodies as providing strong magnetic fields and being easily removable from their respective chambers. Consequently, both cleaning and servicing of each chamber, as well as said intermediary units of magnetic material are easily achieved. Hence, another object of the invention-isto provide a device with the magnetic performance being maintained over the long run, as well as the enhanced durability gaining outstanding economical advantage.

And a further object of the invention is to offer a device magnetically treating a fluid with the markedly improved effect of precipitating and freeing the floc and other impurities in the fluid.

Yet still a further object of the invention is to provide a device whereby the floc or impurities can be regularly discharged outside such that the efficiency of magnetic treatment of a fluid can long be maintained. In this context, an environment-friendly device is offered to market

DETAILED DESCRIPTION

Figure 4:
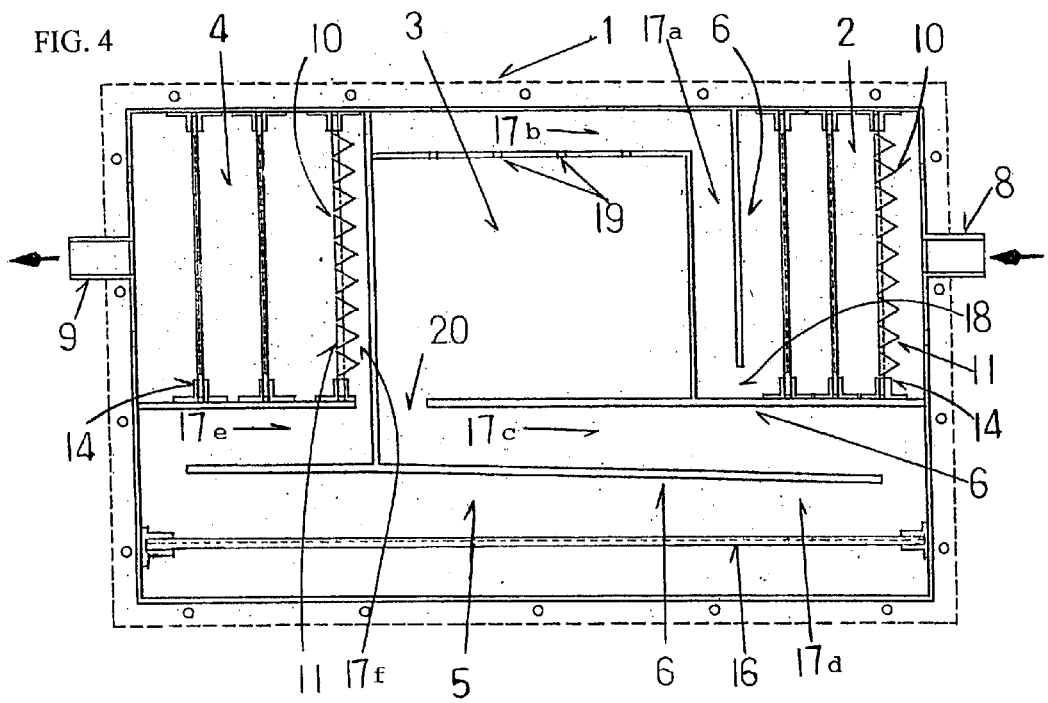
FIG. 4 is a side sectional view of a device.

Referring to FIG. 4, the casing 1 of the device of the invention is subdivided with partition panels 6 into No. 1 chamber 2, No. 2 chamber 3, No. 3 chamber 4, the separation chamber 5 and fluid passages 17a, 17b, 17c, 17d, 17e, 17f. A pair of magnet units 7 are each secured to the outer surfaces of both sides of the casing 1 such that said units can generate a magnetic force penetrating No. 1 chamber 2, No. 3 chamber 4 and the separation chamber 5. In this case, all sides of the casing 1 are preferably made of nor-magnetic material such as stainless steel but its bottom made of magnetic material. And, the side of such a housing encasing a permanent magnet, or a magnet unit 7, as positioned adjacent to the casing 1 is preferably made of non-magnetic material such as stainless steel, while all other sides of said housing are of magnetic material.

As set forth earlier, the device of the invention comprises one side 23 of the casing 1 being made detachable from said casing. In case said side 23 of the casing 1 is once disengaged from, and fixed back to the casing 1, both casing 1 and its side 23 are sealed tight with aid of a refractory packing 22.

Figure 1:
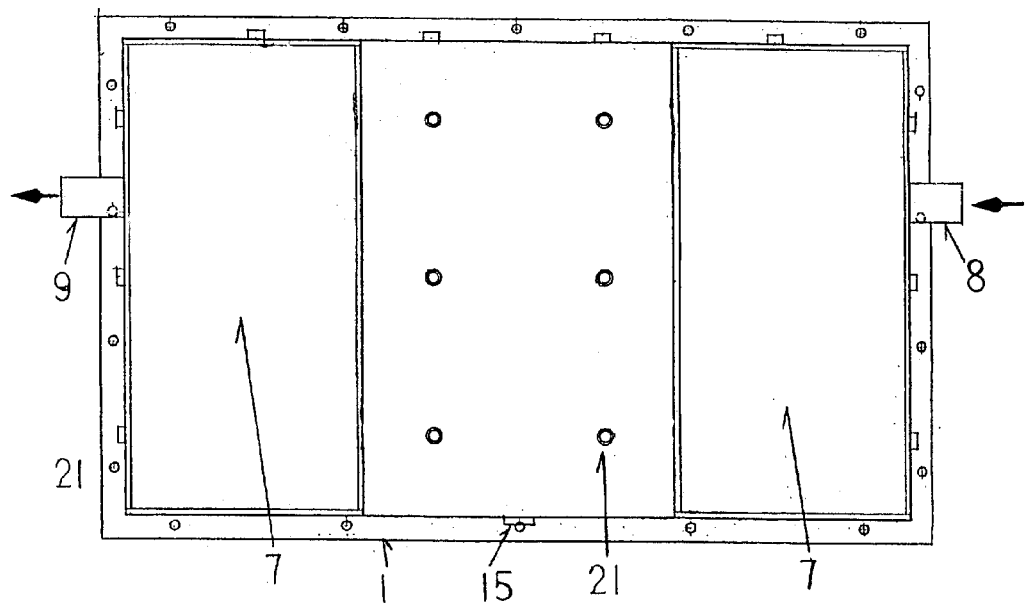
FIG. 1 is a side view of a device for magnetically treating a fluid of the invention.

Referring to FIG. 1, an inlet 8 of a fluid communicating to No. 1 chamber 2 is perforated perpendicularly to, and through the front exterior surface of the casing 1. And, in said No. 1 chamber a louver 10 and at least two latticed bodies 13 of crossed iron bars are positioned parallel each other at an equal distance, and longituidinally to the fluid flow direction. In this case, said inlet 8 and louver 10 preferably made of non-magnetic material such as stainless steel, and a latticed body 13 is preferably of strong magnetic material such as pure iron.

Figure 7:
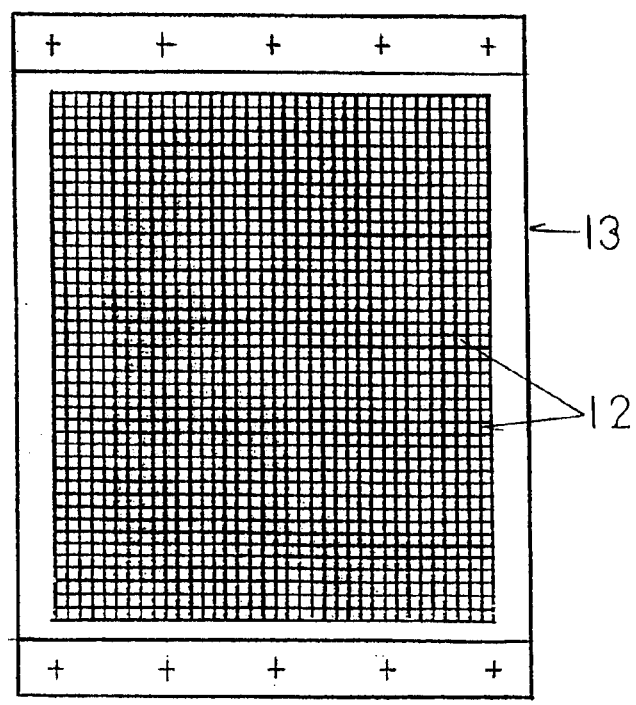
FIG. 7 is a structural view of a latticed body.

Referring also to FIG. 7, a latticed body 13 of such crossed pure iron bars as are mutually welded, for example, is composed of a plurality of squares 12. Said latticed body 13 is preferably mounted on a support frame when necessary to facilitate its travelling over a guide groove 14.

The louver 10 and at least two latticed bodies 13 are removable from Nos. 1, 3 chambers 2, 4 by travelling over the guide grooves 14 deposited in said chambers, respectively.

Passing through a conduit 18 deposited at the bottom panel of No. 1 chamber and fluid passages 17a and 17b as formed by the partition panel 6, respectively, a fluid flows into No. 2 chamber 3 from a plurality of holes 19 perforated through the top panel thereof.

A plurality of holes 19 is perforated through the top panel of No. 2 chamber being adjacent to a fluid passage 17b. A conduit 20 discharging a fluid into the separation chamber 5 through a fluid passage 17c is deposited at the bottom panel of No. 2 chamber 3. A plurality of additive injection pipes 21 are perforated through the top surface of the casing 1 communicating both to No. 1 and No. 3 chambers 2, 4, and to a fluid passage 17b being positioned over No. 2 chamber. Likewise, a plurality of additive injection pipes 21 are perforated through the front and rear surfaces of the casing 1, as well as through both side surfaces of the casing 1 communicating to Nos. 1, 3 chambers 2, 4 and the separation chamber 5. Said pipes 21 are preferably made of stainless steel.

Further, said pipes 21 remain capped when not used lest a fluid should leak therefrom.

Referring to FIG. 4, a meshed metal net 16 is deposited in the separation chamber 5 in the way that it covers all over the bottom of said chamber, or that of the casing 1. Said meshed metal net 16 is preferably secured by those guide grooves deposited perpendicularly to, and at both front and rear interior surfaces of the casing 1, into which said meshed metal net is fitted.

Further, a drain 15 made of stainless steel is perforated through around the center of the bottom of said casing such that the floc and sludge can be discharged outside the device.

It is preferable that fluid passages 17c and 17d are both designed to form as long a course as possible such that the floc and sludge can efficiently be freed from a fluid while the fluid is -slowly running in said long course of fluid passages.

Referring to FIG. 1, an outlet 9 of a fluid is perforated through, and perpendicularly to, the rear surface of the casing 1. And, also in No. 3 chamber 4 a louver 10 and at least two latticed bodies 13 are juxtaposed in an equal distance and longitudinally to the fluid flow direction.

After flowing through an inlet 8 and then between the slats 11 of a louver 10 juxtaposed in No. 1 chamber 2 longitudinally to the fluid flow the direction, a fluid reaches at least two latticed bodies 13.

Figure 5:
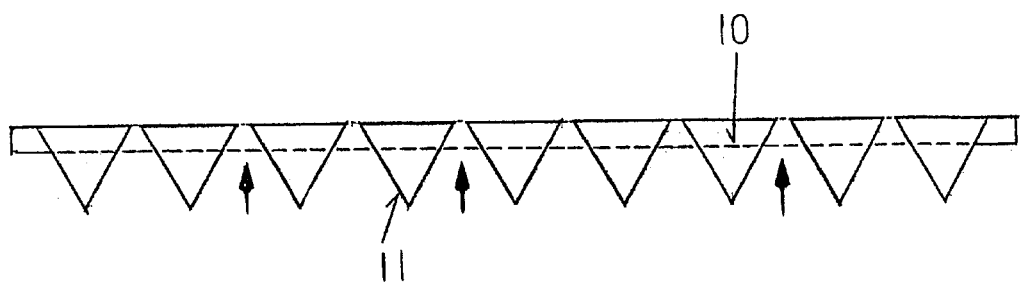
FIG. 5 is a front view of a louver showing the configuration of its slats.
Figure 6:
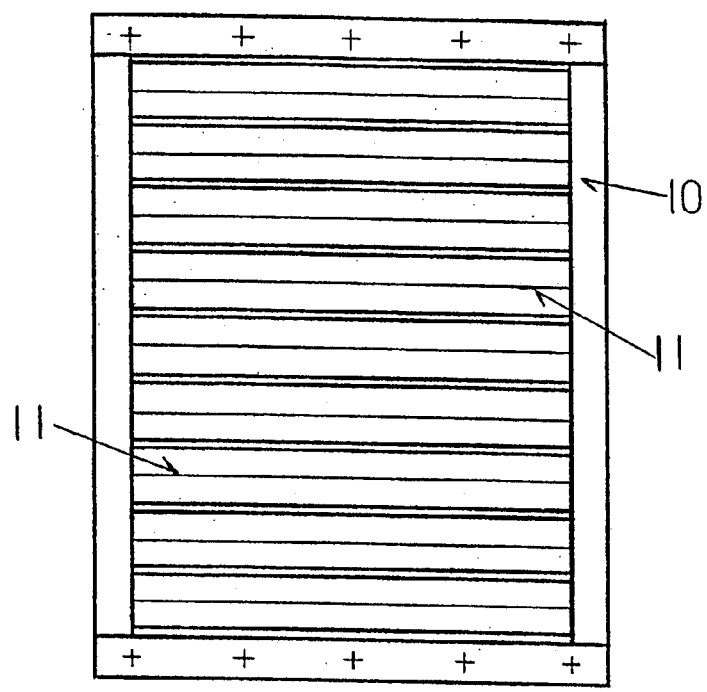
FIG. 6 is a structural view of a louver.

Referring to FIG. 5, said slats 11 of the louver 10 are flare-shaped such that the openings of fluid passages formed by said slats taper off downstream. Said openings of slats 11 tapering off downstream contribute to narrowing the section of magnetic flux passages therebetween. When crossing almost perpendicularly such strong magnetic fields as provided between the slats 11 of the louver 10 whose openings taper off downstream, a fluid is forced to rapidly slow down. Then, suddenly discharged in an open space of No. 1 chamber 2, the fluid diffuses instantaneously regaining speed. While thus diffusing at a high speed, the fluid comes to flow uniformly.

In such a manner, the fluid is magnetically treated efficiently while perpendicularly crossing again such strong magnetic fields as provided by at least two latticed bodies 13 as juxtaposed right behind said louver 10.

Further, in another embodiment applying the invention to a magnetic treatment of a large volume of a fluid such as a river and a pond, the device is scaled up to adapt to such fluid volume and magnetically treat it efficiently. Accordingly, the diameters of both inlet 8 and outlet 9 are adjusted to minimize the resistance of the fluid, or a screw (not illustrated) is deposited between a louver 10 and the latticed body 13 adjacent to said louver to strengthen the fluid flow speed. A Yamaha motor of 600 BP with treatment capacity of 16,000 m3/fH can preferably be used for said screw.

Further, in case a large volume of air is magnetically treated, an axial fan (not illustrated) can preferably be used instead of said screw, such as an Ebara axial fan with a capacity of 60,000 m3/H.

Figure 2:
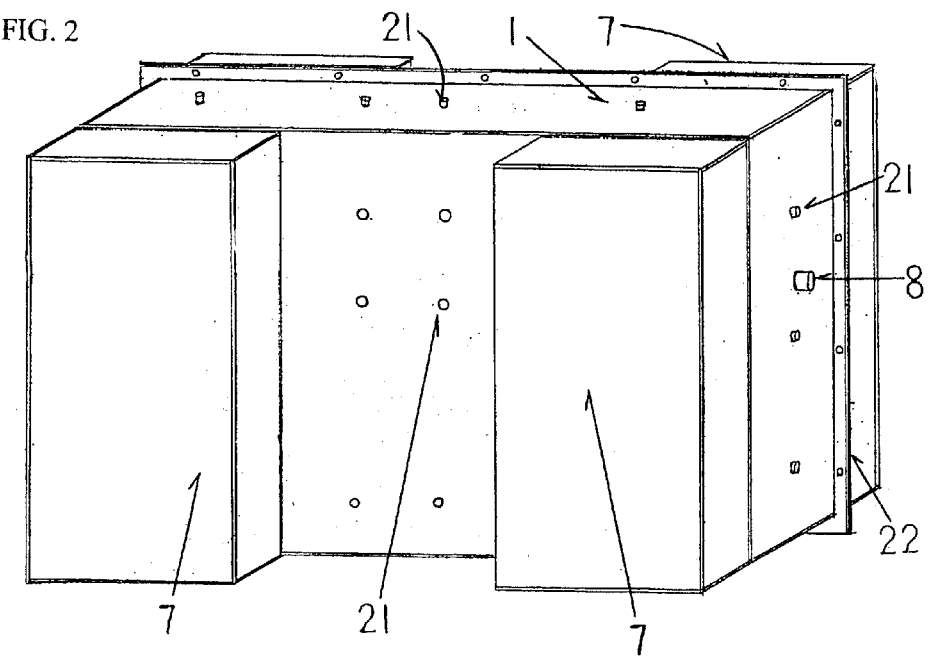
FIG. 2 is a side perspective view of a device.
Figure 3:
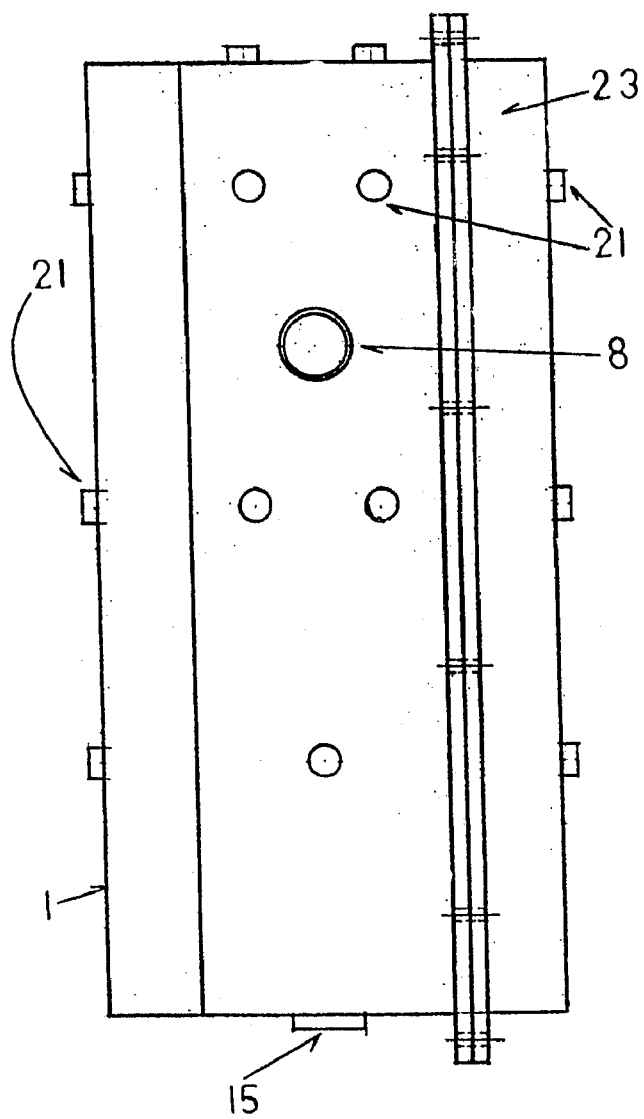
FIG. 3 is a front view of a device.

Referring to FIGS. 1 and 2, a pair of magnet units 7 are secured each to the outer surfaces of both sides of the casings such that a line of magnetic force is generated penetrating through No. 1 and No. 3 chambers 2, 4 as well as a separation chamber 5. As stated earlier, a louver 10 of magnetic material contributes to magnetically treating a fluid flowing between its slats 11.

Concentrating magnetic flux therebetween, each square 12 of a latticed body 13 of a strong magnetic material such as pure iron, can provide ultra-high magnetic fields with magnetic force produced by sad magnet units. A fluid is magnetically treated efficiently while crossing magnetic fields provided perpendicularly to the fluid flow.

The area of each square 12 constituting a latticed body 13 is expanded or reduced such that the strength of magnetic fields affecting a fluid running between said square 12 can be adjusted to both features and volume of said fluid crossing said magnetic fields as provided perpendicularly to the fluid flow direction.

According to fluid features, permanent magnets housed in a magnetic unit 7 can be replaced with magnets of different magnetic force. Thus, the device is usable as a versatile unit treating a fluid with magnetic forces ranging from low, to ultra-high gauss.

Further, a pair of magnet units 7 are secured each to the outer surfaces of both sides of the casing 1 in a way that they can be detached from said casing. Hence, the whole magnet units can easily be replaced with other units according to fluid features.

After magnetically treated in No. 1 chamber 2, a fluid flows downstream through a conduit 18 deposited at the bottom of said No. 1 chamber. The fluid is then guided via fluid passages 17a and 17b into No. 2 chamber 3 passing through a plurality of holes 19 perforated as a fluid conduit through the top panel of No. 2 chamber 3. On entering a larger space of said No. 2 chamber, the fluid instantaneously diffuses therein and loses its flow speed.

According to fluid features, a filtrate or flocculant, as well as compressed air or water, or steam is each injected through additive injection pipes 21 into No. 2 chamber 3 to affect said fluid entering there at a slow speed. Ultra violet ray is also applied to take advantage of the interference action of its electromagnetic wave. Impurities in a variety of fluids are efficiently flocculated or precipitated. In this manner said fluids are purified, filtered and disinfected.

Other additive injection pipes 21 perforated through the casing 1 into Nos. 1 and 2 chambers 2, 3 and the separation chamber 5 are also used for injecting a filtrate or flocculant whenever necessary. The additive injection pipe 21 may also be used for an outlet discharging outside the impurities of a fluid whenever necessary to clean each chamber.

A fluid wherein the floc and sludge are efficiently freed, or disinfected and purified, is discharged into a separation chamber 5 through fluid passages 17c and 17d.

As set forth above, a pair of magnet units 7 are secured each to the outer surfaces of both sides of the casing 1, namely, of a separation chamber 5 such that a line of magnetic force is generated penetrating through said separation chamber. A fluid, as well as the floc separated therefrom are both magnetically treated with said magnet units in the course that both fluid and floc are crossing at a comparatively slow speed the magnetic fields provided by said magnetic unit. The floc and sludge are absorbed magnetically by a meshed metal net 16 deposited covering the bottom of a separation chamber 5 all over. Then, said floc and sludge as absorbed by the meshed metal net 16 rapidly precipitate and accumulate in the neighborhood of a drain 15 deposited at the bottom of the separation chamber. Such precipitated floc can be regularly discharged outside through the drain.

After passing passages 17d and 17e, as well as the separation chamber 5, a fluid flows in the direction of a louver 10 in No. 3 chamber and is forced to slow down in a narrowed passage 17f. The fluid is thus purified while running through the upstream fluid passages and the slats 11 of a louver 10 in No. 3 chamber 4. As set forth earlier, on entering a larger space of said No. 3 chamber 4, the fluid diffuses and runs uniformly. Further, gaining speed, the fluid flows between each square 12 of the juxtaposed latticed bodies 13. Affected by a line of magnet force generated by a pair of magnet units 7 secured each to the outer surfaces of both sides of the casing, strong and harmonic magnetic fields are provided between each square 12 of at least two latticed bodies 13 deposited in No. 3 chamber 4. In this manner, a fluid crossing between said squares 12 is treated again at least twice with ultra-high magnet force. Consequently, the fluid can efficiently be purified such that residual impurities are freed therefrom.

Further, according to the kind of fluid such as a liquid or air, and fluid volume to be treated, the area of each square 12 constituting latticed bodies 13 is enlarged or reduced such that a variety of magnetic fields can be provided ranging from low to ultra-high gauss. As a consequence, residual impurities, as well as the floc can be freed from a variety of such fluids flowing into No. 3 chamber 4, which have already been magnetically treated sufficiently. Thus, a fluid having gone through a repeated process of magnetic treating in No. 3 chamber 4 is discharged outside through an outlet 9.

Further, another embodiment is provided applying the invention to a large volume of a fluid such as a river or pond, wherein in view of fluid volume to be treated, a device of the invention is wholly scaled up. For one thing, the diameters of both inlet 8 and outlet 9 may be adjusted to minimize the resistance of said fluid.

Figure 8:
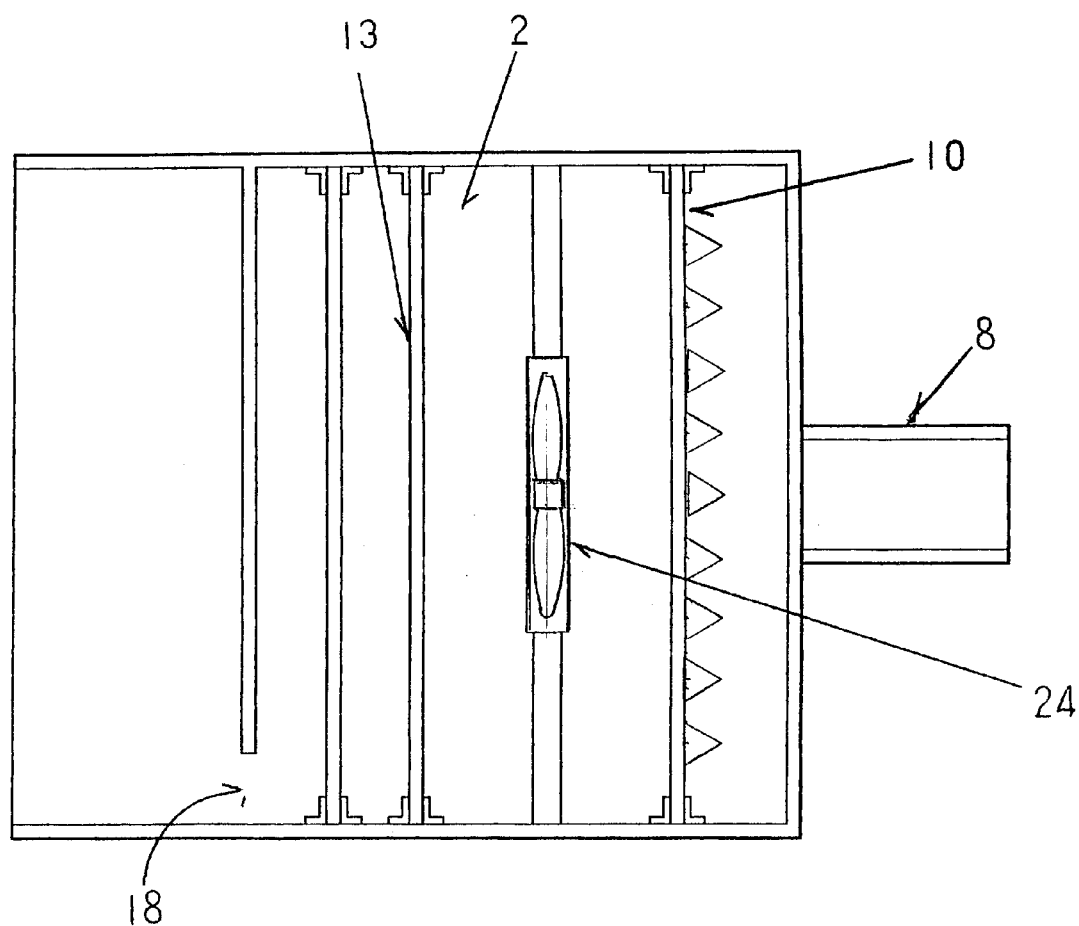
FIG. 8 is a side sectional view of the No. 1 chamber with a screw being fitted between a louver and a latticed body adjacent to the louver.

And further referring to FIG. 8, a screw 24 as for liquid, or an axial fan (not illustrated) as for air is preferably fitted between a louver 10 and the adjacent latticed body 13 deposited in No. 1 or No. 3 chamber such that fluid a flow speed is sufficiently gained. In this case, said screw 24 axial fan is firmly secured to both ceiling and floor of No. 1 or No. 3 chamber, respectively.

The one side 23 of the casing 1 is detachable from the body of said casing. And, a louver 10 and at least two latticed bodies 13 are deposited such that travelling over the guide grooves, both can be removed from Nos. 1 or 3 chambers, respectively. It is, therefore, easy to clean or replace both louver 10 and latticed bodies 13 whenever necessary.

Partition panels 6 forming fluid passages, all inner sides of the casing 1, and every other part of the device being exposed to a liquid are preferably coated with a publicly known titania-based photocatalyst.

I claim:

1. A device for treating with ultra-high magnetic force a fluid flowing through an inlet into and through an outlet from the device, comprising:
   a casing, magnets deposited on outer surfaces of said casing;
   intermediary units of magnetic material inside the device; and
   a continuous system comprising No. 1, No. 2 and No. 3 chambers, a separation chamber, and fluid passages being subdivided within said casing of the device with partition panels,
   said No. 1 chamber including said inlet of the fluid, a louver and a plurality of latticed bodies of crossed iron bars comprising at least some of said intermediary units of magnetic material inside the device, said units being positioned parallel to each other and longitudinally to a fluid flow direction, a conduit guiding the fluid into said No. 2 Chamber, and
   said No. 2 chamber including a panel forming a top of said No. 2 chamber having a plurality of holes perforated therethrough as inlets of the fluid into said No. 2 chamber, and another panel forming said bottom of said chamber having an outlet for the fluid and,
   said separation chamber comprising an inlet connected to said No. 2 chamber, an outlet connected to said No. 3 chamber, a meshed metal net deposited such that said bottom of said casing is covered in its entirety, and a drain positioned around a center of said bottom of said casing, and,
   said No. 3 chamber including a louver and a plurality of latticed bodies of crossed iron bars comprising at least some of said intermediary units of magnetic material inside the device, said units being positioned parallel each other and longitudinally to the fluid flow direction, and said outlet for the fluid.

2. A device as claimed in claim 1, wherein said louver and said plurality of latticed bodies of crossed iron bars are removable from said No. 1 or No. 3 chambers, respectively.

3. A device as claimed in claims 1 or 2 wherein said louvers each have slats tapering off in the fluid flow direction, and forming passage openings of said fluid.

4. A device as claimed in claims 1 or 2 wherein said lattice bodies have a square configuration, the area of which is enlarged or reduced according to fluid conditions.

5. A device as claimed in claim 1, wherein the casing further comprises first and second sides opposing each other, and the first side is detachable.

6. A device as claimed in claim 1 further comprising permanent magnets being secured to outer surfaces of the first and the second sides of said casing, respectively, such that a line of magnetic force is generated penetrating said No. 1 and No. 3 chambers, as well as said separation chamber.

7. A device as claimed in claim 1 further comprising a plurality of additive injection pipes being perforated, respectively, (1) through the top surface of said casing, communicating to No. 1, No. 3 chambers and a fluid passage formed over No. 2 chamber, (2) through both front and rear surfaces of said casing, communicating to Nos. 1, 3 chambers and the separation chamber, and, (3) through the surfaces of both sides of said casing, communicating to No. 2 chamber and the separation chamber.

8. A device as claimed in claim 1 further comprising screw or axial fan deposited between said louver and the latticed body adjacent to said louver.

* * * * *